US012764636B2

(12) United States Patent
Kaikkonen et al.

(10) Patent No.: US 12,764,636 B2
(45) Date of Patent: Oct. 13, 2026

(54) SMALL DATA TRANSMISSION CONTROL

(71) Applicant: Nokia Technologies Oy, Espoo (FI)

(72) Inventors: Jorma Johannes Kaikkonen, Oulu (FI); Jussi-Pekka Koskinen, Oulu (FI); Samuli Heikki Turtinen, Li (FI)

(73) Assignee: Nokia Technologies Oy, Espoo (FI)

(*) Notice: Subject to any disclaimer, the term of this patent is extended or adjusted under 35 U.S.C. 154(b) by 442 days.

(21) Appl. No.: 18/279,328

(22) PCT Filed: Feb. 10, 2022

(86) PCT No.: PCT/EP2022/053264
§ 371 (c)(1),
(2) Date: Aug. 29, 2023

(87) PCT Pub. No.: WO2022/184402
PCT Pub. Date: Sep. 9, 2022

(65) Prior Publication Data

US 2024/0147348 A1 May 2, 2024

(30) Foreign Application Priority Data

Mar. 2, 2021 (FI) ..................................... 20215227

(51) Int. Cl.
*H04W 4/00* (2018.01)
*H04W 48/02* (2009.01)
*H04W 76/20* (2018.01)

(52) U.S. Cl.
CPC ........... *H04W 48/02* (2013.01); *H04W 76/20* (2018.02)

(58) Field of Classification Search
CPC .............................. H04W 48/02; H04W 76/20
See application file for complete search history.

(56) References Cited

U.S. PATENT DOCUMENTS 12,543,070 B2 * 2/2026 Laselva .................. H04L 51/58
2017/0048746 A1 * 2/2017 Rönneke ........... H04W 28/0289
2020/0236544 A1 * 7/2020 Kunz ...................... H04W 4/70
2022/0361239 A1 * 11/2022 Xu ........................ H04W 76/27
(Continued)

FOREIGN PATENT DOCUMENTS

EP 3979752 A1 * 4/2022 ............ H04W 72/23

OTHER PUBLICATIONS

ZTE Corporation et al., "Details of RRC-based IDT," 3GPP TSG-RAN2#111e, R2-2007449, Aug. 17-28, 2020.
(Continued)

*Primary Examiner* — Elisabeth Benoit Magloire
(74) *Attorney, Agent, or Firm* — McCarter & English, LLP

(57) ABSTRACT

There are provided apparatuses, methods and computer program products. In accordance with an embodiment, there is disclosed a method including obtaining a status of at least one control element regarding allowability of small data transmission by the user equipment; examining the status to determine whether small data transmission by the user equipment is prohibited or allowed in an inactive state of the user equipment; causing, based on the determination, the user equipment to perform either initiation of a small data transmission procedure in the inactive state if the status indicates that initiation of the small data transmission is not prohibited; or prohibiting initiation of the small data transmission procedure.

18 Claims, 6 Drawing Sheets

(56) References Cited

U.S. PATENT DOCUMENTS

| | | | | |
|---|---|---|---|---|
| 2023/0030443 | A1* | 2/2023 | Chen | H04W 72/23 |
| 2023/0075703 | A1* | 3/2023 | Zhu | H04W 76/27 |
| 2023/0180340 | A1* | 6/2023 | Yue | H04L 1/1812 370/328 |
| 2023/0276520 | A1* | 8/2023 | Xu | H04W 76/27 370/329 |
| 2024/0080785 | A1* | 3/2024 | Shi | H04W 76/27 |
| 2025/0089097 | A1* | 3/2025 | Shah | H04W 72/115 |

OTHER PUBLICATIONS

Oppo, "Procedure of Small Data Transmission," 3GPP TSG-RAN WG2 #111-e, R2-2006836, Aug. 2020.
"New Work Item on NR small data transmissions in Inactive state", ZTE Corporation, 3GPP TSG RAN Meeting #86, RP-193252, Dec. 2019, 4 pages.

* cited by examiner

SMALL DATA TRANSMISSION CONTROL

TECHNICAL FIELD

The present invention relates to a method and apparatus for controlling transmission of small amount of data from a user equipment to a wireless network when the user equipment is in an inactive state.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. In 5G systems a mobile communication device, which may also be called as a user equipment (UE), may be in different states depending whether it is connected with the network or not. For example, when the mobile communication device does not have an active data communication connection, the mobile communication device may be in a so-called inactive state or in an idle state. If the mobile communication device had a message to be transmitted when the mobile communication device is in the inactive state, the mobile communication device should typically change the state to connected and only after that may be able to transmit the message or messages.

Messages to be transmitted may not always contain a large payload but may only have a relatively small payload. Therefore, the network may be able to allow transmission of messages having relatively small payload while the mobile communication device is in the inactive state such as an RRC_INACTIVE state of the 5G-NR. This may avoid a connection setup and subsequently release to the inactive state procedures to happen for each small data transmission. Furthermore, power consumption and signalling overhead may be reduced. This kind of small data transmission procedure may also be called as an SDT procedure for short. This kind of transmission is also called as inactive state message transmission in this specification.

Currently, the network may not be able to control how often the mobile communication device is allowed to use the SDT procedure for data transmission—especially, over RACH (random access channel) based SDT where the configuration is provisioned through system information. However, the problem may similarly apply for CG (cell group) based SDT as well since the network may still want to configure the mobile communication device with CG-SDT resources to allow infrequent SDT to be transmitted. This may lead to the cases where the mobile communication devices are frequently using SDT resources although it would be better from network point of view to limit the amount of SDT sessions given the data transmission due to lack of proper channel state reporting, etc., are not used. Every SDT session setup requires signalling between the user equipment and network which could be considered as signalling overhead.

Therefore, a mechanism to somehow prohibit transmission of messages having relatively small payload in the inactive state from time to time might address the above mentioned drawback.

SUMMARY

Some embodiments provide a method, apparatus, and computer program product for controlling transmission of small amount of data from a user equipment to a wireless network when the user equipment is in an inactive state without changing the state of the user equipment from inactive state to connected state.

Some embodiments are implemented in the context of the 5G communication systems and relate to a network implementation of mechanisms for controlling under which conditions small data transmission mechanism is allowed or prohibited. In particular, some embodiments provide one or more control elements which indicate the user equipment whether it is allowed to use small data transmission (SDT) at the moment or not. In accordance with an embodiment, one or more prohibit timers may be used to determine if the user equipment is allowed to utilize the small data transmission mechanism at the moment or not. In accordance with an embodiment, the network may also indicate whether a counter should be used to limit the amount of small data transmissions until a predetermined condition is fulfilled. For example, the counter may be used to control the user equipment to switch from an inactive state to a connected state before the small data transmission mechanism is again allowed for the user equipment.

Some embodiments enable the network to control how often the UE is allowed to transmit using the SDT procedure.

In accordance with an embodiment, the network decides and controls prerequisites for prohibiting SDT and indicates this to the user equipment either via dedicated signalling or via broadcast. Following information, among other things, may be indicated to the user equipment:

- whether one or more SDT prohibit timers shall be used;
- whether one or more SDT counters shall be used.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a user equipment comprising means for:

- obtaining a status of at least one control element regarding allowability of small data transmission by the user equipment;
- examining the status to determine whether small data transmission by the user equipment is prohibited or allowed in an inactive state of the user equipment;
- causing, based on the determination, the user equipment to perform either:
- initiating a small data transmission procedure in the inactive state of the user equipment if the status indicates that initiation of the small data transmission is not prohibited; or
- prohibiting initiation of the small data transmission procedure.

According to a second aspect there is provided a method comprising:

- obtaining a status of at least one control element regarding allowability of small data transmission by the user equipment;

examining the status to determine whether small data transmission by the user equipment is prohibited or allowed in an inactive state of the user equipment;

causing, based on the determination, the user equipment to perform either:

initiating a small data transmission procedure in the inactive state of the user equipment if the status indicates that initiation of the small data transmission is not prohibited; or prohibiting initiation of the small data transmission procedure.

According to a third aspect there is provided an apparatus comprising at least one processor; and at least one memory including computer program code the at least one memory and the computer program code configured to, with the at least one processor, cause the apparatus to perform at least the following:

obtain a status of at least one control element regarding allowability of small data transmission by the user equipment;

examine the status to determine whether small data transmission by the user equipment is prohibited or allowed in an inactive state of the user equipment;

cause, based on the determination, the user equipment to perform either:

initiating a small data transmission procedure in the inactive state of the user equipment if the status indicates that initiation of the small data transmission is not prohibited; or prohibit initiation of the small data transmission procedure.

According to a fourth aspect there is provided a computer program comprising computer readable program code which, when executed by at least one processor; cause the apparatus to perform at least the following:

obtain a status of at least one control element regarding allowability of small data transmission by the user equipment;

examine the status to determine whether small data transmission by the user equipment is prohibited or allowed in an inactive state of the user equipment;

cause, based on the determination, the user equipment to perform either:

initiating a small data transmission procedure in the inactive state of the user equipment if the status indicates that initiation of the small data transmission is not prohibited; or prohibit initiation of the small data transmission procedure.

According to a fifth aspect there is provided a network element comprising means for:

determining that a user equipment is to implement at least one control element regarding allowability of small data transmission by the user equipment for determining by the user equipment whether transmission of a message using a small data transmission procedure in an inactive state of the user equipment is prohibited; and providing the user equipment indication of the usage of the at least one control element.

According to a sixth aspect there is provided a method comprising:

determining that a user equipment is to implement at least one control element regarding allowability of small data transmission by the user equipment for determining by the user equipment whether transmission of a message using a small data transmission procedure in an inactive state of the user equipment is prohibited; and providing the user equipment indication of the usage of the at least one control element.

According to a seventh aspect there is provided an apparatus comprising at least one processor; and at least one memory including computer program code the at least one memory and the computer program code configured to, with the at least one processor, cause the apparatus to perform at least the following:

determining that a user equipment is to implement at least one control element regarding allowability of small data transmission by the user equipment for determining by the user equipment whether transmission of a message using a small data transmission procedure in an inactive state of the user equipment is prohibited; and providing the user equipment indication of the usage of the at least one control element.

According to an eighth aspect there is provided a computer program comprising computer readable program code which, when executed by at least one processor; cause the apparatus to perform at least the following:

determining that a user equipment is to implement at least one control element regarding allowability of small data transmission by the user equipment for determining by the user equipment whether transmission of a message using a small data transmission procedure in an inactive state of the user equipment is prohibited; and providing the user equipment indication of the usage of the at least one control element.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to “an”, “one”, or “some” embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term ‘base station’ refers to a logical element containing logical communication system layers (e.g. L1, L2, L3). The base stations of different RATs may be implemented in the same hardware or at separate hardware. It should also be mentioned that although the expressions “each base station” and “each mobile station” or “each user equipment” may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
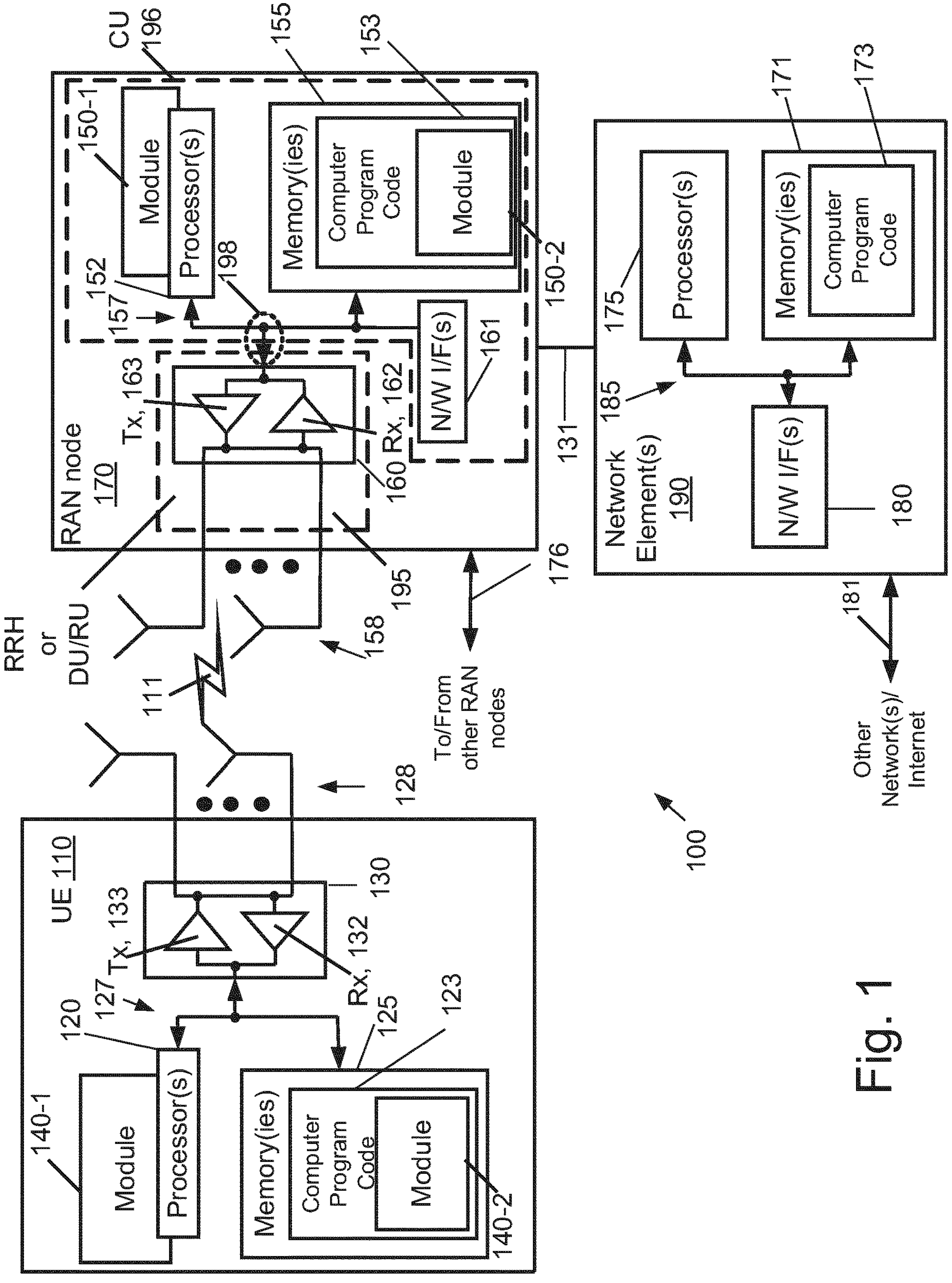
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figure 2:
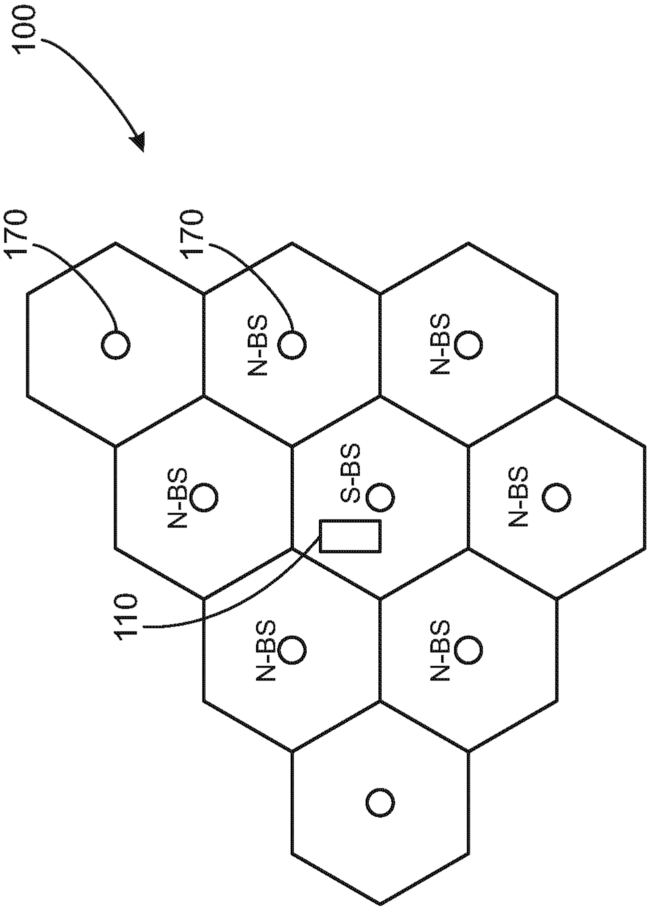
FIG. 2 illustrates a part of a wireless network having several base stations and an exemplary user equipment.

FIG. 2 illustrates a part of a wireless network 100 having several base stations 170 and an exemplary user equipment 110. In FIG. 2 it is assumed that the base station marked as S-BS is the serving base station, when the user equipment is in connected state, and the base station where the user equipment is camped on when not in connected state. Some of the neighbouring base stations are labelled as N-BS in FIG. 2. In practical situations the serving base station and the camped on base station may change e.g. when the user equipment in moving, or if the signal strength from different base stations changes (e.g. signals from a neighbouring base station N-BS becomes stronger than signals from the currently serving base station.

When the user equipment 110 is in the inactive state (RRC_INACTIVE), data transmission from the user equipment 110 to the cell is normally prevented. Hence, the user equipment 110 should resume the connection i.e. to change the state of the user equipment 110 to the connected state (RRC_CONNECTED) to be able to receive data from the network (mobile terminated MT, downlink DL) and transmit data to the network (mobile originated MO, uplink UL). Thus, connection setup and subsequently release to the inactive state typically happens for each data transmission irrespective of how small and infrequent the data packets are. This results in unnecessary power consumption and signalling overhead.

So called "Signalling Radio Bearers" (SRBs) are defined for NR as Radio Bearers (RBs) which can be used for transmission of certain types of messages such as RRC or NAS (non-access stratum) messages. In accordance with an example, the following signalling radio bearers are defined:

SRB0 is for RRC messages using a common control channel (CCCH logical channel);

SRB1 is for RRC messages, which may include a piggy-backed NAS message, as well as for NAS messages prior to the establishment of SRB2, all using a dedicated control channel (DCCH logical channel);

SRB2 is for NAS messages, all using DCCH logical channel. SRB2 has a lower priority than SRB1 and may be configured by the network after AS security activation;

SRB3 is for specific RRC messages when UE is in NG-RAN E-UTRA-NR dual connectivity ((NG)EN-DC) or in NR-NR dual connectivity (NR-DC), all using DCCH logical channel.

So called "Data Radio Bearers" (DRBs) are used to carry User-Plane traffic (user data) such as IP (Internet Protocol) packets between the user equipment and the RAN node, for example.

Figure 3B:
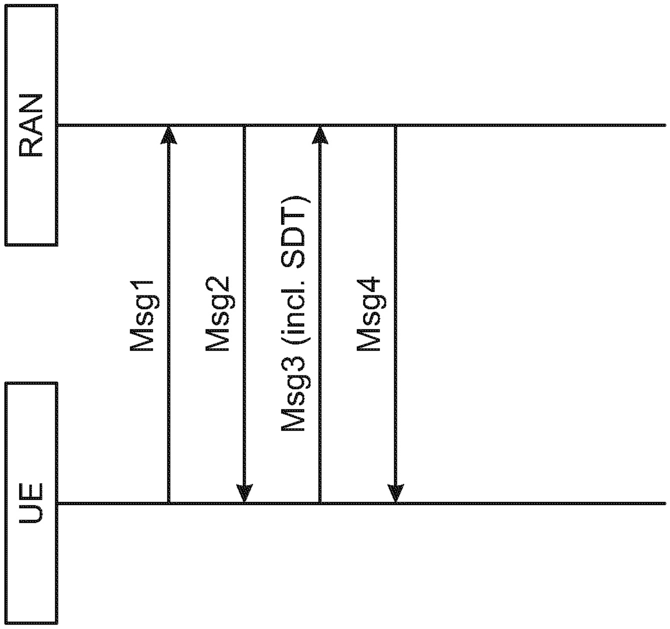
FIG. 3*b* shows an example of transmission of the small data utilizing a 4-step RACH transmission.
Figure 3A:
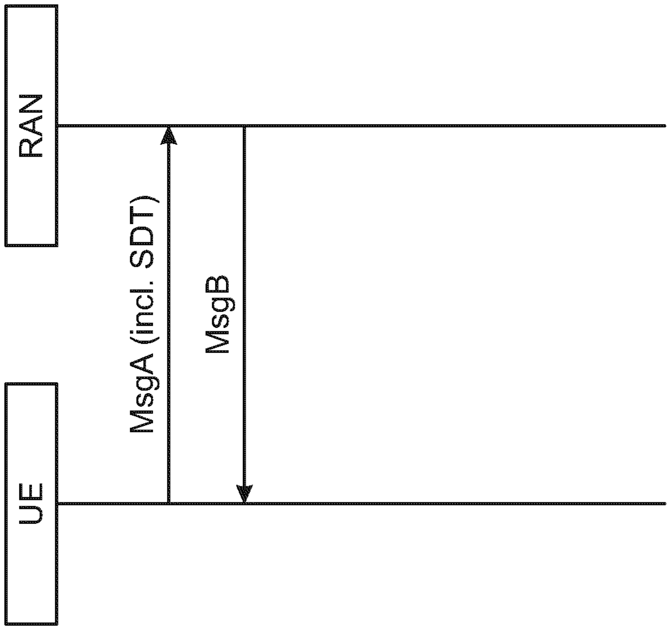
FIG. 3*a* shows an example of transmission of the small data utilizing a 2-step RACH transmission.

In accordance with an approach, transmission of the small data is performed utilizing the so-called 2-step RA (Random Access) procedure via RACH transmission i.e. one (a first) message (MSGA) from the user equipment to the network, and a second (a reply) message (MSGB) from the network to the user equipment. In this case at least part of the small data may be inserted in the first message from the user equipment to the network as is illustrated in the signalling diagram of FIG. 3a.

In accordance with another approach, transmission of the small data is performed utilizing the so-called 4-step RA procedure via RACH transmission (RA based SDT, RA-SDT) i.e. two messages (a first and a third) message (MSG1, MSG3) from the user equipment to the network, and two messages (a second and a fourth) message (MSG2, MSG4) from the network to the user equipment. In this case at least part of the small data may be inserted in the third message, as is illustrated in the signalling diagram of FIG. 3b.

In accordance with yet another approach, transmission of the small data is performed utilizing a configured grant (CG based SDT, CG-SDT). In this case the small data is transmitted in a configured grant resource.

Control Plane data (e.g. the RRC messages or some of them) could also be restricted to use a specific small data transmission mechanism which could also be configured RRC message or SRB specifically.

In accordance with an approach, a user equipment could always apply default configurations specified for the SRBs when used for small data transmission.

In the following some specific examples of small and infrequent data traffic are shortly described. Smartphone applications include traffic transmitted from instant messaging services (e.g. whatsapp, QQ, wechat etc.), heart-beat/keep-alive traffic from instant messaging and/or email clients and other applications, push notifications from various applications, etc. Non-smartphone applications include traffic from wearables (e.g. periodic positioning information etc.), sensors (Industrial Wireless Sensor Networks transmitting temperature, pressure readings periodically or in an event triggered manner etc.), smart meters and smart meter networks sending periodic meter readings, etc.

Signalling overhead from the inactive state user equipments for small data packets may be a general problem and may become a critical issue with increasing number of user equipments operating in the NR, not only for network performance and efficiency but also for the user equipment battery performance. In general, any device that has intermittent small data packets in the inactive state may benefit from enabling small data transmission in the inactive state.

It may be the user equipment which decides whether to utilize SDT or not based on a data volume threshold. For example, the user equipment may examine the amount of data to be transmitted and on the basis of the examination decides whether to try to use the SDT or to transfer to the connected state for transmission of the data.

The user equipment may be able to use configured grant based small data transfer (CG-SDT) if at least the following criteria is fulfilled (1) user data is smaller than the data volume threshold; (2) configured grant resource is configured and valid; (3) user equipment has valid timing advanced (TA) information.

In accordance with some embodiments, the network decides if transmission of small data from the user equipment is allowed in the inactive state and if so, what kind of messages are allowed. Further, the network may also decide e.g. the maximum length for the small data messages and/or how often the user equipment is allowed to initiate and/or use the small data transmission procedure (e.g. CG-SDT or RA-SDT or both). These decisions may be made by a network operator who enters those small data transmission related parameters to the wireless communication network, or they may be determined by the manufacturer of elements of the wireless communication network and/or by some other entity.

In other words, the network controls which RRC messages are allowed to use the small data transmission mechanism/procedure SDT, how often they may be used by a user equipment, in what conditions they may be used or may not be used, etc. The network indicates the RRC messages that are allowed to use SDT, including whether the RRC messages are sent using a special RRC container or the existing messages. This could also include using a different signalling radio bearer than normally. For example, a signalling radio bearer 2 (SRB2) could be used for a message, or the data could be included in a container whose type is indicated via the message.

On the other hand, if transmission of small data from the user equipment is not allowed in the inactive state, the network may or may not provide any indication that transmission of small data from the user equipment is not allowed in the inactive state.

In the following some embodiments are described how transmission of relatively short (small) messages may be restricted or prohibited and how the restrictions and/or prohibitions may be indicated to the user equipment.

Figure 6:
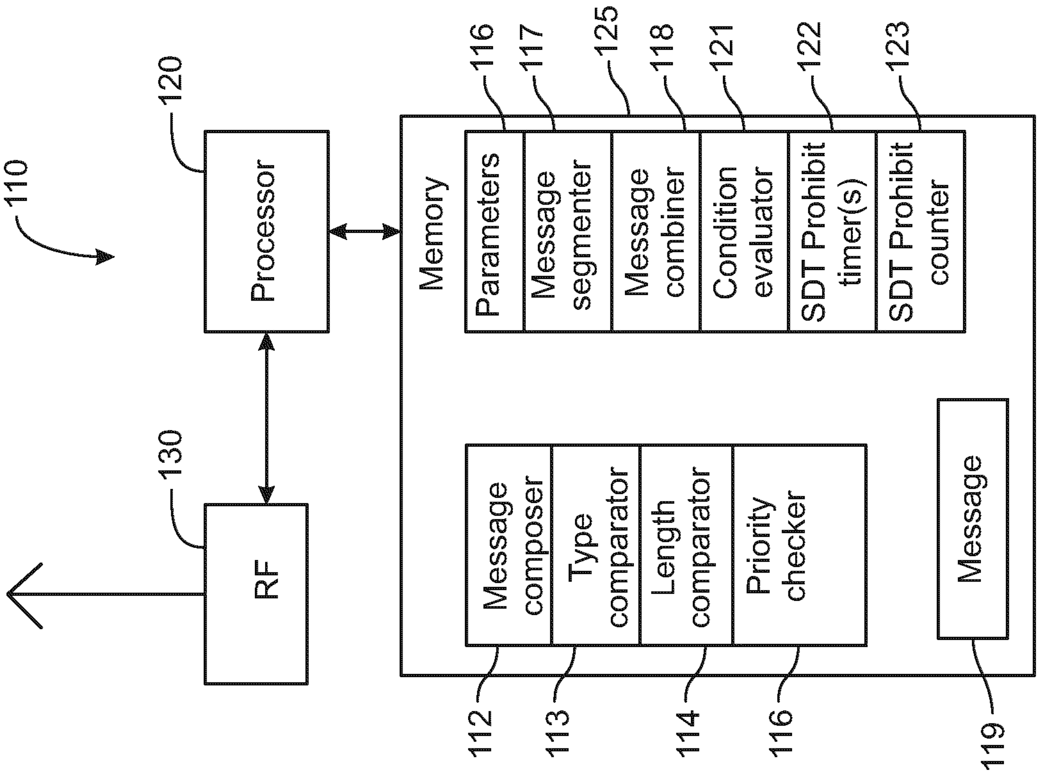
FIG. 6 shows a block diagram of an apparatus in accordance with at least some embodiments.

In accordance with an embodiment, the network configures a prohibit mechanism which utilizes one or more control elements for determination by a user equipment whether initiation of and utilization of a small data transmission mechanism is prohibited or not when the user equipment is in an inactive state. For example, the network may utilize a timer for indicating the user equipment a period when the user equipment is prohibited to transmit data by the SDT procedure. Such a prohibit timer or timers 122 (FIG. 6) may be specified for different SDT procedures or may be a general timer applicable for each available SDT procedure. As an example, if the configured grant based SDT is applicable in the network, the network may configure a CG-SDT specific prohibit timer. As another example, if the RA based SDT is applicable in the network, the network may configure an RA-SDT specific prohibit timer. If both the configured grant based SDT and the RA based SDT is applicable in the network, the network may configure separately the CG-SDT specific prohibit timer and the RA-SDT specific prohibit timer, or the network may configure a common SDT prohibit timer for both SDT procedures.

Information about the prohibit timer(s) may be transmitted by the network to user equipments by e.g. a broadcast message(s) or user equipment specific message(s).

In accordance with an embodiment, the RAN node 170 forms a configuration message in which small message transmission related parameters are transmitted to one or more user equipment. For example, the configuration message may be a RRCRelease message which the RAN node 170 may use to push a certain user equipment to the inactive state. This kind of message may be thought as a message dedicated to a certain receiver. As another example, the configuration message may be a broadcast message such as a cell select info message which don't have a dedicated receiver but all user equipment within the serving area of the RAN node 170 may be able to receive and interpret the message. Also other messages may be used for transmitting the parameters to the user equipment. Hence, the network may send information of the SDT prohibit timer or SDT prohibit timers to the user equipment using the same configuration message(s) which is/are used for informing the other SDT related parameters.

Figure 4:
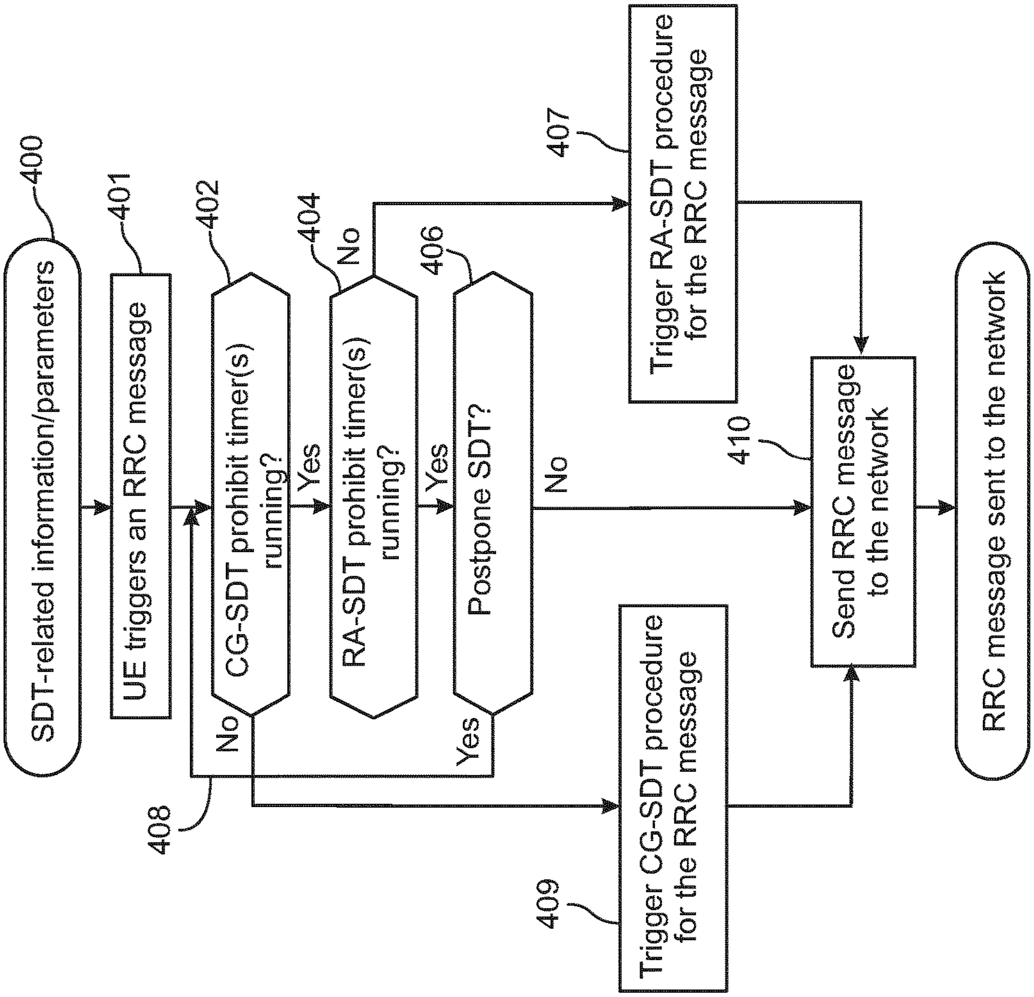
FIG. 4 shows an exemplary flow chart illustrating operations of a user equipment when examining whether transmitting messages as small data is allowed, in accordance with an embodiment.

FIG. 4 is a flow diagram which illustrates some actions by a user equipment when it aims to transmit small data amounts, in accordance with an embodiment.

The user equipment 110 receives indication of causes which are allowed to be transmitted by utilizing the small data transmission mechanism and some other information regarding the SDT mechanism such as the SDT timer, an SDT counter 123, a threshold value and/or some other information (block 400 in FIG. 4). The indication may have been transmitted by a network element (e.g. the RAN node 170) as a broadcast message or in a dedicated message to the user equipment 110. Such indication may have been transmitted well before the user equipment 110 has a small message to be transmitted, wherein the user equipment has stored the corresponding information in a memory for later use.

When there is a message 119 to be transmitted (block 401) e.g. in the memory 125, a condition evaluator 121 of the user equipment examines whether transmission of the small data is not prohibited at the moment. In accordance with an embodiment, the condition evaluator 121 examines a status of the prohibit timer or prohibit timers (blocks 402 and 404). If any of the prohibit timers is running, that particular SDT procedure is not applicable. For example, if the network has configured the CG-SDT specific prohibit timer and the RA-SDT specific prohibit timer and the CG-SDT specific prohibit timer is running and the RA-SDT specific prohibit timer is not running, the condition evaluator 121 may deduce that at least the CG-SDT procedure is not allowed at the moment. Therefore, the user equipment may decide to use the RA-SDT procedure (block 407) or postpone (block 406) the transmission of the small message.

In accordance with one example where prohibit timer is running, usage of (specific i.e. CG-SDT and RA-SDT) SDT is not allowed and regular connection establishment or resume may be attempted by the user equipment instead (block 409). In this case the user equipment may transmit (block 410) RRC Setup Request or RRC Resume Request or RRC Re-establishment Request. In some examples, this behaviour may be restricted/configured on a per radio bearer (DRB or SRB) basis. In some examples the behaviour may be restricted/configured per resource (CG) basis.

In accordance with one example where prohibit timer is running, usage of (specific i.e. CG-SDT and RA-SDT) SDT is not allowed and the user equipment shall wait until the prohibit timer is stopped before initiating the SDT procedure. In some examples, this behaviour may be restricted/configured on a per radio bearer (DRB or SRB) basis.

In the following, some further examples of possible behaviour in connection with prohibited SDT transmission are provided, wherein the condition evaluator 121 and some other SDT related elements of the user equipment may behave accordingly.

In accordance with one example where the user equipment postpones the transmission of the small message the condition evaluator 121 may examine at intervals (block 408) whether the prohibit timer is running or has expired (has stopped running). When the prohibit timer expires the condition evaluator may cause the user equipment to initiate CG-SDT or RA-SDT procedure (blocks 407 and 410).

In accordance with one example where prohibit timer is stopped or expires, an access stratum layer (AS) of a wireless telecom protocol stack of the user equipment informs a non-access stratum layer (NAS) of the wireless telecom protocol stack that SDT is allowed, wherein the user equipment may begin initiation of the small data transmission.

According to some embodiments of the disclosure, the network may also configure the conditions when the prohibit timer should be (re-)started by the user equipment. For example, the network may inform the user equipment that example the prohibit timer shall be started by the user equipment upon transmitting SDT data or when receiving an RRC Release message which terminates the SDT procedure.

Furthermore, the network may also configure the conditions when the prohibit timer should be stopped by the user equipment. In one example the prohibit timer is stopped when certain amount of time elapses, cell (re)selection occurs, or when RRC Connection is established/resumed.

In one example the network indicates the user equipment to (re-)start SDT prohibit timer e.g. in RRC signalling (e.g. RRC Release) or MAC signalling (MAC CE).

The expression the prohibit timer is running means that the timer is performing some kind of measurement of time. The expression the prohibit timer has stopped means that the prohibit timer is no longer measuring time. A reason for the stoppage may be that a certain condition has occurred, a certain time has lapsed since the beginning of the time measurement, etc. The expression the prohibit timer has expired means also that the prohibit timer is no longer measuring time because it has reached a certain upper limit (or lower limit if the prohibit timer is counting down).

According to some embodiments of the disclosure, the network may further configure a counter which counts the amount of SDT transmissions by a user equipment. Such an SDT counter may then be used by the user equipment in the determination whether further SDT transmissions are allowed or prohibited.

In accordance with an embodiment, the SDT counter is incremented each time the user equipment transmits data by the SDT procedure. When a succeeding SDT transmission is to be prepared by the user equipment, the condition evaluator 121 examines the value of the SDT counter and compares the value with a certain maximum value (a configured threshold value). If the value of the SDT counter has not exceeded the maximum value, the user equipment may perform the SDT transmission. On the other hand, if the comparison reveals that the maximum value has been reached, the SDT transmission is not performed but the user equipment may postpone the transmission or may utilize the connected state transmission.

The SDT counter may be reset to an initial value (e.g. zero) when certain conditions are fulfilled. For example, the user equipment may change its state to connected for message transmission before it can again utilize the SDT procedure in the inactive state, wherein the SDT counter may be set to the initial value.

In accordance with an embodiment, the SDT counter is used together with the SDT prohibit timer. For example, the user equipment is allowed to initiate SDT procedures as many times as the value of the SDT counter indicates during certain amount of time, e.g., during the time indicated by the prohibit timer time. In one example, the user equipment starts the SDT prohibit timer upon first SDT attempt and is not allowed to initiate (further) SDT transmissions if the amount of SDT procedures (=the value of the SDT counter) is not less than the configured threshold value and the SDT timer is running. In one alternative example, the user equipment starts the SDT prohibit timer when the SDT counter becomes the same than the configured threshold value. In other words, the SDT timer may be started when a first SDT transmission attempt is performed or when the number of SDT transmissions have reached the configured threshold value.

In accordance with one example, the prohibit timer is configured via broadcast and/or dedicated signalling e.g. system information message or RRC Release message.

In accordance with one example, the prohibit timer is counting microseconds, milliseconds, or seconds, slots, subframes, or symbols, number of SDT occasions (e.g., CG-SDT occasions, or RA-SDT occasions), etc.

In one example, the prohibit mechanism mandates user equipment to trigger connection establishment/resume procedure for any new data/service attempt. For instance, the user equipment is allowed to perform a number of SDT attempts after which it cannot use SDT without establishing connection normally.

In accordance with one example, the prohibit mechanism is applied/the SDT timer is started when a certain amount of data (a threshold amount) using SDT has been transmitted. Such threshold amount of data could be configurable threshold different from or the same as the data volume threshold. In some examples the data amount threshold is applied over a certain time window. In one example, the prohibit mechanism is applied/the SDT timer is started when the threshold number of packets (e.g., SDAP or PDCP or RLC or MAC SDUs or PDUs) have been transmitted using the SDT procedure.

In accordance with one example, the prohibit mechanism can be applied on a per radio bearer (SRB or DRB) basis. For example, if data becomes available to transmit using SDT via SRBs, the user equipment could be allowed to always initiate SDT regardless of the prohibit timer being running.

When there is a message 119 to be transmitted e.g. in the memory 125 of the user equipment and the condition evaluator 121 has determined that the SDT procedure is applicable for the transmission of the message 119, a RRC message may be formed by a message composer 112 (FIG. 6) of the user equipment. A cause comparator 113 examines the cause of the message and compares the cause with the allowed causes. If the cause is among the allowed causes a length comparator 114 compares the length of the message with a maximum length parameter SDT_limit and if the length is smaller than or equal to the maximum length, a small data transmission procedure is triggered, wherein certain signalling is performed between the user equipment and the network. A flag or other indication may be set to indicate that the small data transmission procedure can be used for the transmission of the message. The message is provided to a transmitter 133 for transmission. The transmitter 133 examines the value of the flag and determines that the transmission may be performed without changing the state from inactive to connected. Hence, the transmitter 133 and the network exchange corresponding signals to deliver the small message to the network. The details of the signalling depend e.g. on the cause of message exchange procedure selected for the small data transmission. For example. the above described 2-step or 4-step RACH transmission mechanism could be used.

If, however, the cause is not among the allowed causes or the length of the message is longer than the maximum length, a normal RRC resume procedure may be triggered, wherein the flag or another indicator is set to indicate that a normal message transmission procedure shall be used. The transmitter 133 examines the value of the flag and determines that the state should be changed from inactive to connected during the transmission of the message. Hence, the status of the user equipment is changed from inactive to connected (RRC_Connected) and the transmitter 133 and the network exchange corresponding signals to deliver the message to the network.

In accordance with an embodiment, the user equipment 110 may also have a priority checker 116 which may examine possible priority indications of messages in a situation in which there are more than one message to be transmitted utilizing the small data transmission mechanism. The priority checker 116 may then arrange the messages for transmission in the order indicated by the priorities, wherein the messages are provided to the transmitter 133 in that order.

In accordance with an embodiment, the user equipment 110 may have a message segmenter 117 which may divide a message which is longer than the maximum length to segments having length smaller than or equal to the maximum length. In such a situation the segments of the message may be provided to the transmitter 133 one after the other so that the transmitter 133 transmits each segment using the small data transmission mechanism.

In accordance with an embodiment, the user equipment 110 may have a message combiner 118 which may combine two or more messages, which are shorter than the maximum length into one message so that the length of the combined message is shorter than or equal to the maximum length. Hence, the combine message may be transmitted using the small data transmission mechanism.

In accordance with an embodiment, the small data transmission mechanism is allowed for each cause of messages provided that the length of the message is shorter than or equal to the maximum length. Thus, the cause comparator 113 need not examine the cause of the message but the length comparator 114 compares the length of the message with the maximum length parameter SDT_limit and if the length is smaller than or equal to the maximum length, a small data transmission procedure can be triggered.

Figure 5:
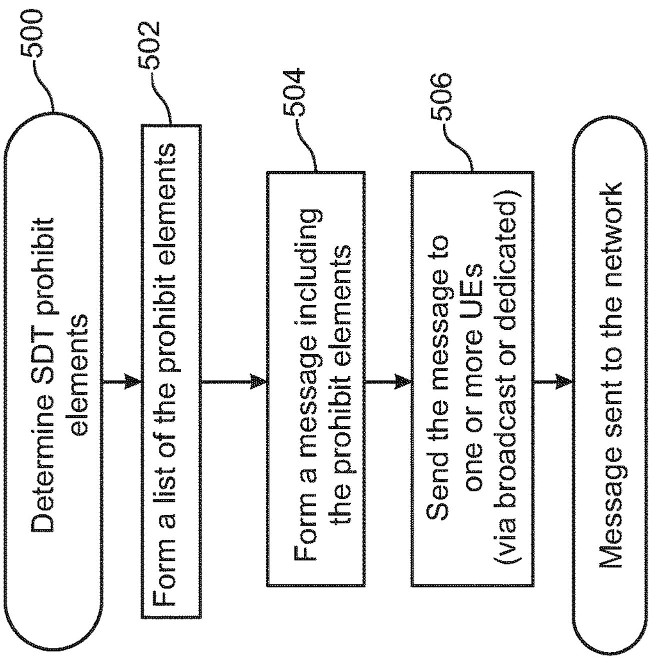
FIG. 5 illustrates as a flow diagram operations which may be performed by a network element to inform parameters related to prohibit conditions for small data transmission mechanism, in accordance with an embodiment.

FIG. 5 illustrates as a flow diagram actions which may be performed by a network element, e.g. the RAT 170, to inform parameters related to the SDT prohibit conditions, such as the SDT prohibit timers, the SDT counter, the threshold(s) etc. in addition to other small data transmission mechanism related information, in accordance with an embodiment. The network element determines (block 500) which kind of SDT prohibit elements shall be used and forms a list or some other information element in which those information are included (block 502). The network element may form a broadcast message (block 504) and include the above mentioned information to the message. The message may then be transmitted (block 506).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 7:
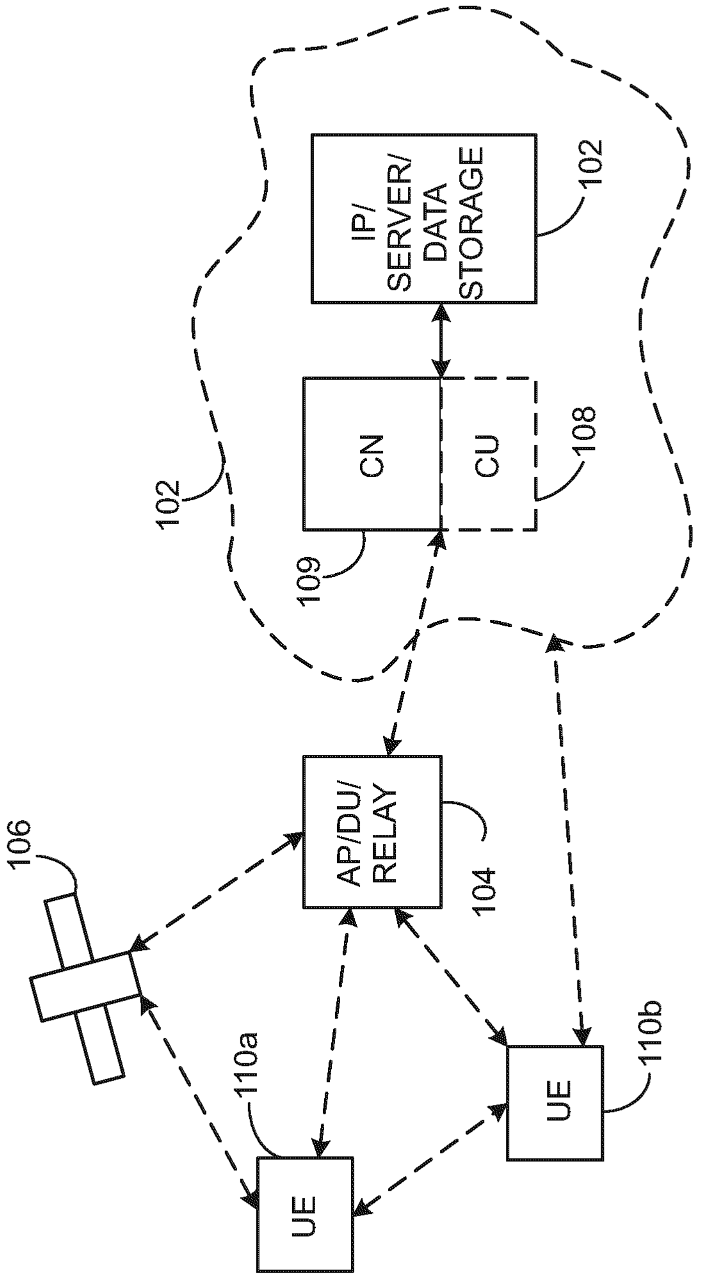
FIG. 7 shows a part of an exemplifying wireless communications access network in accordance with at least some embodiments.

FIG. 7 depicts examples of simplified system architectures only showing some elements and functional entities, all being logical units, whose implementation may differ from what is shown. The connections shown in FIG. 7 are logical connections; the actual physical connections may be different. It is apparent to a person skilled in the art that the system typically comprises also other functions and structures than those shown in FIG. 7.

The embodiments are not, however, restricted to the system given as an example but a person skilled in the art may apply the solution to other communication systems provided with necessary properties.

The example of FIG. 7 shows a part of an exemplifying radio access network.

FIG. 7 shows user equipments 110*a* and 110*b* configured to be in a wireless connection on one or more communication channels in a cell with an access node (such as (e/g) NodeB) 104 providing the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 7) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 7 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 7 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 7). A HNB Gateway (HNB-GW), which is typically installed within an operator's network may aggregate traffic from a large number of HNBs back to a core network.

FIG. 9 illustrates an example of a block diagram of an apparatus 110 in accordance with at least some embodiments of the present invention. The apparatus 110 may be, for example, a part of the resource manager. The apparatus 110 comprises a processor 1022, a memory 1024 and a transceiver 1024. The processor is operatively connected to the transceiver for controlling the transceiver. The apparatus may comprise a memory 1026. The memory may be operatively connected to the processor. It should be appreciated that the memory may be a separate memory or included to the processor and/or the transceiver. The memory 1026 may be used to store information, for example, about maximum length, allowed causes, default values for some parameters and/or for some other information.

FIG. 9 also illustrates the operational units as a computer code stored in the memory but they may also be implemented using hardware components or as a mixture of computer code and hardware components.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A user equipment comprising:

at least one processor; and at least one memory storing instructions that, when executed with the at least one processor, cause the user equipment to perform:

obtaining a status of at least one control element regarding allowability of a small data transmission procedure by the user equipment, wherein said at least one control element comprises a small data transmission counter;

determining, by examining the status, whether the small data transmission procedure by the user equipment is prohibited or allowed in an inactive state of the user equipment;

obtaining a value of the small data transmission counter;

obtaining a threshold value;

comparing the value of the small data transmission counter with the threshold value to determine whether initiation of the small data transmission procedure is prohibited; and causing, based on the determining and comparing, the user equipment to perform either:

initiating the small data transmission procedure in the inactive state of the user equipment when the status indicates that the initiation of the small data transmission procedure is not prohibited; or prohibiting the initiation of the small data transmission procedure.

2. The user equipment according to claim 1, wherein said at least one control element further comprises:

a prohibit timer.

3. The user equipment according to claim 2 where the instructions, when executed with the at least one processor, cause the user equipment to perform: determining that the initiation of the small data transmission procedure is not prohibited when the prohibit timer is not running.

4. The user equipment according to claim 2 configured to:

determine that the initiation of the small data transmission procedure is not prohibited if the prohibit timer is running and the comparing indicates that the value of the small data transmission counter is less than the threshold value.

5. The user equipment according to claim 2 where the instructions, when executed with the at least one processor, cause the user equipment to perform:

starting the prohibit timer when the comparing indicates that the value of the small data transmission counter has reached the threshold value; and starting the prohibit timer and initiating the small data transmission counter to an initial value when the user equipment initiates a first small data transmission procedure.

6. The user equipment according to claim 2 where the instructions, when executed with the at least one processor, cause the user equipment to perform:

starting the prohibit timer upon performing the small data transmission procedure or when receiving a radio resource control (RRC) release message terminating the small data transmission procedure.

7. The user equipment according to claim 2 where the instructions, when executed with the at least one processor, cause the user equipment to perform:

stopping the prohibit timer or setting the small data transmission counter to an initial value when at least one of a certain amount of time elapses, cell selection or cell reselection occurs, or when a radio resource control (RRC) connection is established or resumed.

8. The user equipment according to claim 1 configured to:

increment the value of the small data transmission counter in connection with one or both of the following:

upon initiating the small data transmission procedure; or when performing the small data transmission procedure.

9. The user equipment according to claim 1 where the instructions, when executed with the at least one processor, cause the user equipment to perform:

obtaining a status of a first prohibit timer associated with a first radio bearer;

obtaining a status of a second prohibit timer associated with a second radio bearer;

examining the status of the first prohibit timer to determine whether the first prohibit timer is running;

causing, based on the determination that the first prohibit timer is not running, the user equipment to initiate the small data transmission procedure in the inactive state by the first radio bearer: or causing, based on the determination that the first prohibit timer is running, the user equipment to perform:

examining the status of the second prohibit timer to determine whether the second prohibit timer is running; and causing, based on the determination that the second prohibit timer is not running, the user equipment to initiate the small data transmission procedure in the inactive state by the second radio bearer.

10. The user equipment according to claim 9, wherein: the first radio bearer is a signalling radio bearer; and the second radio bearer is a data radio bearer.

11. The user equipment according to claim 1 where the instructions, when executed with the at least one processor, cause the user equipment to perform:

initiating a configured grant based small data transmission or random access based small data transmission when the determining reveals that the status of any of the at least one control element is not indicating that the initiation of the small data transmission procedure by the user equipment is prohibited.

12. The user equipment according to claim 1 where the instructions, when executed with the at least one processor, cause the user equipment to perform:

causing an access stratum layer of a protocol stack of the user equipment to inform a non-access stratum layer of the protocol stack that the initiation of the small data transmission procedure is allowed.

13. A method comprising:

obtaining a status of at least one control element regarding allowability of a small data transmission procedure by a user equipment;

determining, by examining the status, whether the small data transmission procedure by the user equipment is prohibited or allowed in an inactive state of the user equipment, wherein said at least one control element comprises a small data transmission counter;

obtaining a value of the small data transmission counter;

obtaining a threshold value;

comparing the value of the small data transmission counter with the threshold value to determine whether initiation of the small data transmission procedure is prohibited; and causing, based on the determining and comparing, the user equipment to perform either:

initiating the small data transmission procedure in the inactive state of the user equipment if the status indicates that the initiation of the small data transmission procedure is not prohibited; or prohibiting the initiation of the small data transmission procedure.

14. The method according to claim 13, wherein said at least one control element further comprises:

a prohibit timer.

15. The method according to claim 14 further comprising:

determining that the initiation of the small data transmission procedure is not prohibited if the prohibit timer is not running.

16. A network element comprising:

at least one processor; and at least one memory storing instructions that, when executed with the at least one processor, cause the network element to perform:

determining that a user equipment is to implement at least one control element for determining by the user equipment whether transmission of a message using a small data transmission procedure in an inactive state of the user equipment is prohibited; and providing the user equipment indication of usage of the at least one control element, wherein said at least one control element comprises a small data transmission counter and the providing provides a timer for the small data transmission counter and a corresponding threshold value to enable the user equipment to perform comparing a value of the small data transmission counter with the threshold value to determine whether initiation of the small data transmission procedure is prohibited.

17. The network element according to claim 16, wherein said at least one control element further comprises:

a prohibit timer.

18. A method comprising:

determining that a user equipment is to implement at least one control element for determining by the user equipment whether transmission of a message using a small data transmission procedure in an inactive state of the user equipment is prohibited; and providing the user equipment indication of usage of the at least one control element, wherein said at least one control element comprises a small data transmission counter and the providing provides a timer for the small data transmission counter and a corresponding threshold value to enable the user equipment to perform comparing a value of the small data transmission counter with the threshold value to determine whether initiation of the small data transmission procedure is prohibited.

* * * * *